Sept. 20, 1971  I. T. BO  3,605,905
AGRICULTURAL IMPLEMENTS
Filed Jan. 8, 1969  4 Sheets-Sheet 1

INVENTOR
Isak T. Bö
BY
Watson, Cole, Grindle & Watson
ATTORNEY

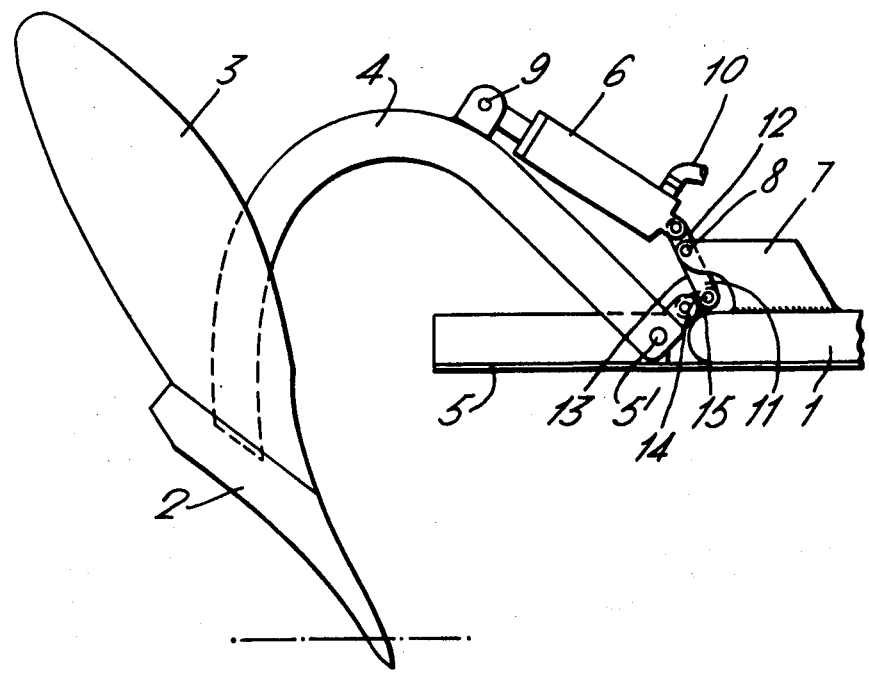

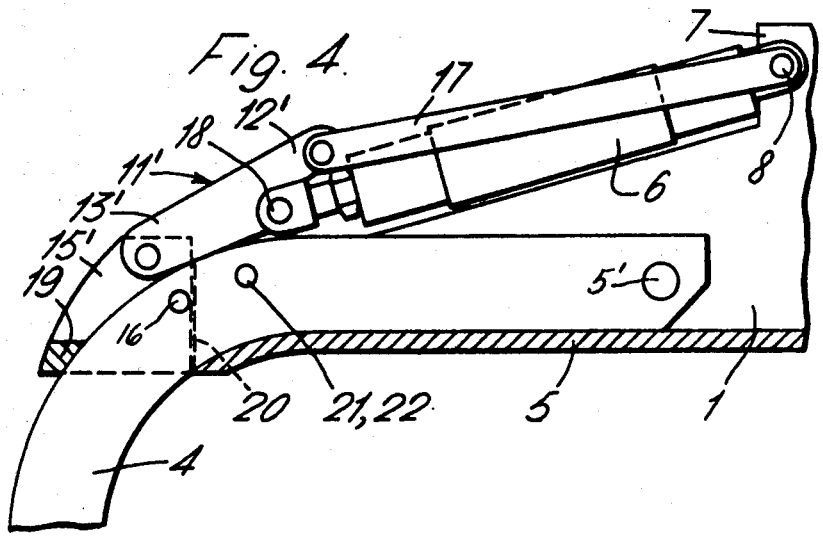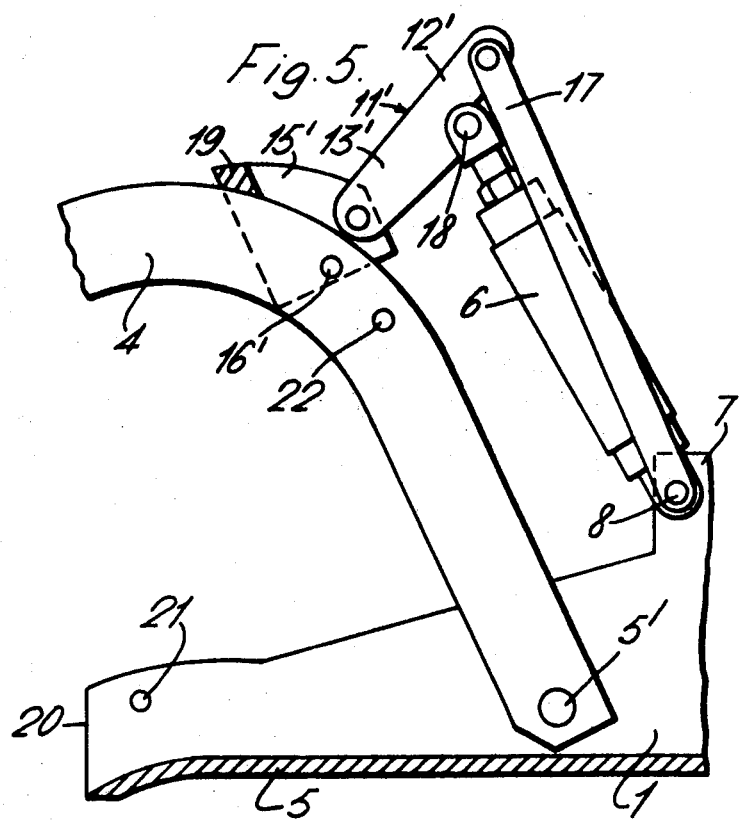

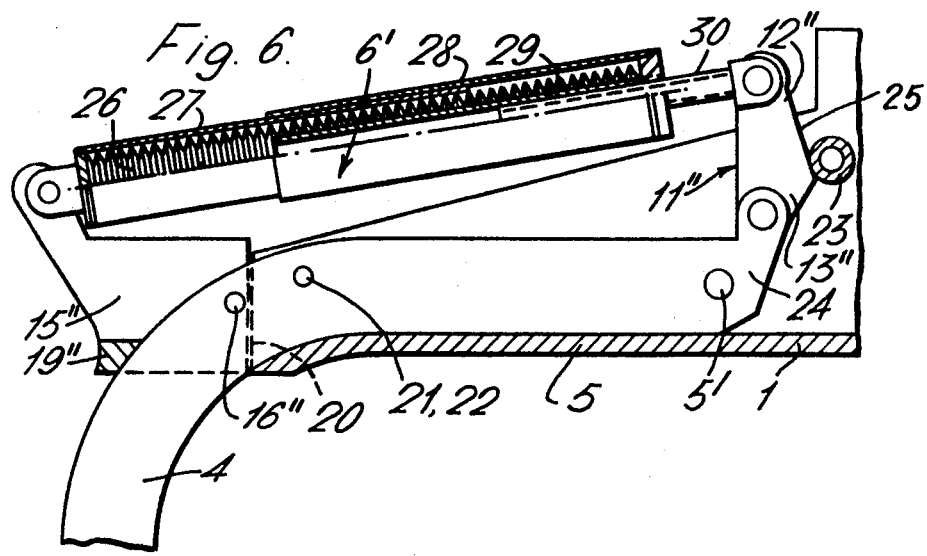
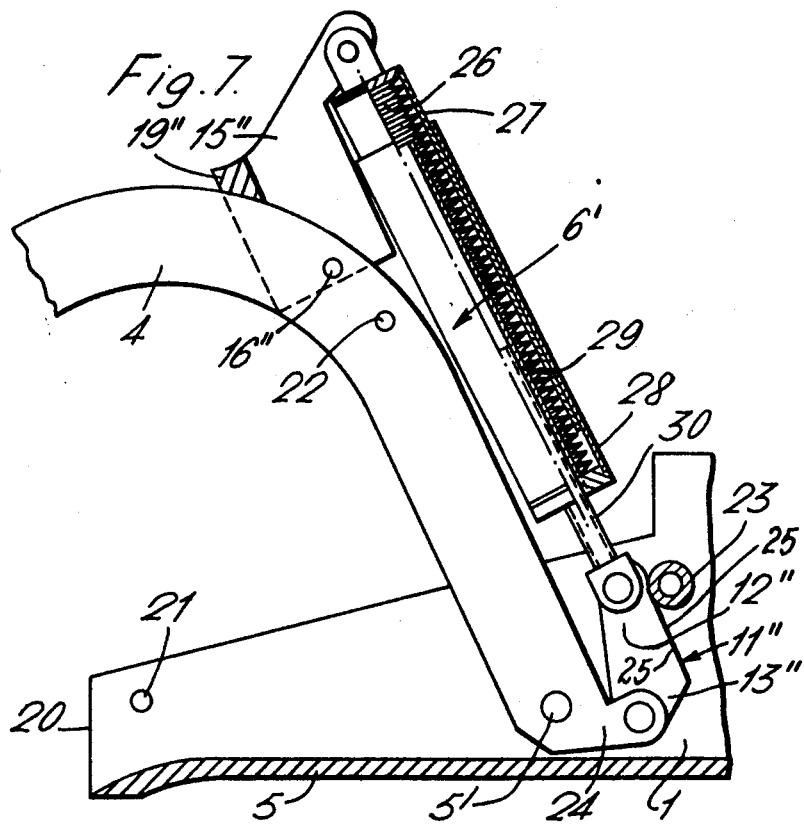

United States Patent Office 3,605,905
Patented Sept. 20, 1971

3,605,905
AGRICULTURAL IMPLEMENTS
Isak T. Bo, Randaberg pa Jaeren, Norway, assignor to Kyllingstad Plogfabrik A/S, Kleppe, Norway
Filed Jan. 8, 1969, Ser. No. 789,911
Claims priority, application Norway, Jan. 9, 1968, 80/68; Apr. 5, 1968, 1,335/68, 1,336/68
Int. Cl. A01b *61/00, 35/24*
U.S. Cl. 172—265
2 Claims

ABSTRACT OF THE DISCLOSURE

A hinged pressure releasable connecting means is provided to join the frame of an agricultural implement to the beam which supports the implement. The connecting means comprises a pressure device connected at one end to a two-armed lever. The pressure device may be connected to the implement beam, and the lever arranged to cooperate with the implement frame, or the positioning can be reversed. By a suitable choice of the relative lengths of the arms of the two-armed lever and of other link means there may be obtained an accurate setting of the pressure required to release the connecting means.

---

The present invention relates to improvements in the connecting means between a frame of an agriculture implement, such as a plough or a harrow, and the beam which supports the implement. The means is of the type wherein a pressure device, such as a hydraulic plunger and cylinder device is inserted between the frame and the beam so that the implement may be swung back into working position after it has been released due to impingement on a hindrance such as a stone or a root in the soil.

Such release means may be semi-automatic in which case the implement, upon release, must be raised by means of the control rods of the tractor, or run backwards in order to cause the connecting means to re-adopt the locked position. The means may be automatic, in which case the release device is constantly subjected to a pressure in order to automatically return the implement to working position when the hindrance is passed. The present invention is particularly related to the latter type of means, but may also be adapted to means of the former type, without essential amendments to the principle involved.

In many known connecting means, the implement beam is hinge connected to the implement frame, and in parallel to the hinge connection there is provided a spring device and/or a hydraulic plunger and cylinder device which is cocked when the implement is released by butting against a hindrance. In such means, the pressure which is to cause the return of the implement to working position is consequently relatively low at the moment of release and increases thereafter to a constant value. The connecting means merely offers a small resistance to release, so that the implement may be released also when it abuts against a hindrance which the implement ordinarily should break through. It would be more desirable if the pressure resistance required for release could initially be of a certain predetermined value, that this pressure decrease after release so that the upwardly directed turning movement of the implement beam could be performed quickly and forcibly, and that the pressure then set at a value which is sufficient to return the implement to the working position when the hindrance has been left behind.

The object of the present invention is to provide such an improved connecting means. According to the invention, this is achieved by providing in addition to the hinge connection between the implement frame and the implement beam, a link system which comprises a pressure device one end of which is hinge connected to one of the implement parts, frame and beam, respectively, and further a two-armed lever which is hinge connected to the other part of the pressure device and, through a link, hinge connected to the same implement part. By a suitable choice of the relative lengths of the arms of the two-armed lever and of the link there may be obtained an accurate setting of the pressure required to release the connecting means.

It has been found particularly suitable in one embodiment to make the arm of the two-armed lever which is connected to the pressure device substantially shorter than the arm which is connected to the implement frame. It is then possible to substantially reduce the amount of compression to which the pressure device is subject and consequently the counter-pressure movement relative to the swinging movement of the implement beam. Correspondingly, and for the purpose of adjusting the value of the permanent pressure, i.e. the return pressure, it has been found advantageous to make the connecting link substantially shorter than the longer arm of the two-armed lever. This insures that the release of the implement will be performed against a not negligible counter-pressure from the pressure device.

To insure that the implement is not supported by the pressure device when in working position, and that the pressure device is not subject to any sideways forces, the implement frame can be provided with a U-shaped extension in which the implement beam is guided and hingedly supported. This arrangement is of particular interest when a plurality of implements is arranged and moved in parallel, but relatively displaced in the direction of the movement from one another. In such a case it is of particular importance that each individual implement is secured from motion in sideways directions.

In one embodiment of the invention the two-armed lever is hinge connected to the pressure device at the end of the shorter arm, and hinge connected to the implement frame through a further link, while the longer arm is connected to the implement beam by means of an intermediary link.

In a second embodiment the two-armed lever is arranged at that end of the pressure device which is distant from the implement frame. The advantages of the first embodiment are present to their full extent in the second embodiment while at the same time a restriction of the relative movements of the pressure device is obtained. In the second embodiment the pressure device is connected in parallel to the shorter lever arm and to the further link. This maintains the connecting means under full control when not in use, i.e. when the implement has been disconnected.

In this second embodiment it is suitable to connect the pressure device and the further link to the implement frame at the same hinge point, thereby simplifying manufacture.

The hinge point of the further link on the implement frame may, however, be displaced downwardly and forwardly relative to the swinging centre of the pressure device.

The link which connects the other end of the pressure device to the implement beam may, as the intermediary link of the first embodiment, be hinge connected to the implement beam. It is particularly suitable to so arrange the parts so that this link may be locked relative to the implement beam in order to improve the control of the movements to be performed by the connecting means when in operation.

In a third embodiment of this invention the two-armed lever is hinge connected at the end of one arm to the pressure device, and hinge connected at the end of the other to the implement beam. The two-armed lever engages a roller which is supported by the implement frame, so that the mean center of rotation of the two-armed lever is not fixed, but moves during a swinging movement of the implement beam. Thus the length relation between the two arms of the two-armed lever is varied during such movement and the stroke length of the pressure device is decreased. This has the advantage of reducing the fluid volume required in the pressure device, a fact which is of particular interest when more implement units are arranged in connection with one and the same tractor, or when springs are provided so that the springs may be made shorter and thereby less expensive.

In the accompanying drawings, the means of the invention are illustrated by some embodiments.

In order to illustrate the state of the art, FIG. 1 shows a previously known arrangement for the release and return of an agricultural implement, here shown merely by means of a plough beam.

FIG. 3 is a corresponding view, showing the implement in its raised position.

FIG. 4 is a side view of the means in a second embodiment, with the implement in its working position.

FIG. 5 is a similar view, with the implement in its raised position.

FIG. 6 is a view of the means in a still further embodiment, showing the implement in working position.

FIG. 7 is a similar view, with the implement in its raised position.

Figure 1:
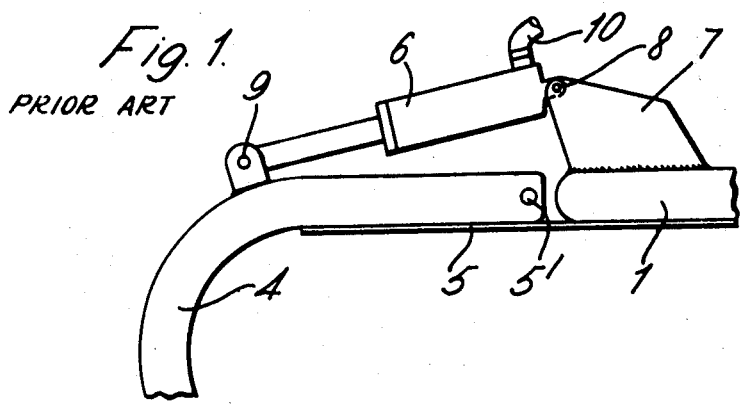

In the drawing, 1 is a portion of an implement frame which, at the forward end which is not shown, is to be connected to a draw bar which is turn is connected to a tractor. The draw bar may be provided with a plurality of frames 1, for the purpose of simultaneously operating a number of implements, such as ploughs or harrows. In the drawing, one implement is shown in the form of a plough having a cutter 2 and a mould board 3 which are supported by a plough beam 4, it being presumed that a number of such implements are provided in the athwart direction of the tractor, displaced relatively to each other in the direction of the forward movement applied to the ploughs, either one beside the other or displaced relatively to each other in the case of other implements, such as harrows.

In the prior art arrangement shown in FIG. 1, each implement beam 4 is hinged at 5' in an extension 5 of the implement frame 1, so that the implement may swing upwardly when abutting against a hinderance such as a big stone. In order to return the implement to its working position, a pressure device is provided between the frame 1 and the beam 4, such pressure device being shown in the form of a hydraulic plunger and cylinder device 6, one part of which is hinge connected at 8 to a nose 7 of the frame 1 and the second part of which is hinge connected at 9 to the implement beam 4. The cylinder of the pressure device is, through a conduit 10, connected to a hydraulic expansion tank, not shown, so that when the implement abuts against a hinderance it will swing upwardly against the resistance offered by the hydraulic device which, when the hinderance has disappeared, forces the implement back to the working position.

In the prior art connecting means, the counter-pressure against an upwardly directed swinging movement of the implement beam is at a minimum at the moment when such movement is initiated, increases thereafter to a certain value during the swinging movement, and then is kept constant. This sequence is not the most desirable one, as the counter-pressure should be at a maximum at the release, so that release is not effected when not required.

Figure 2:
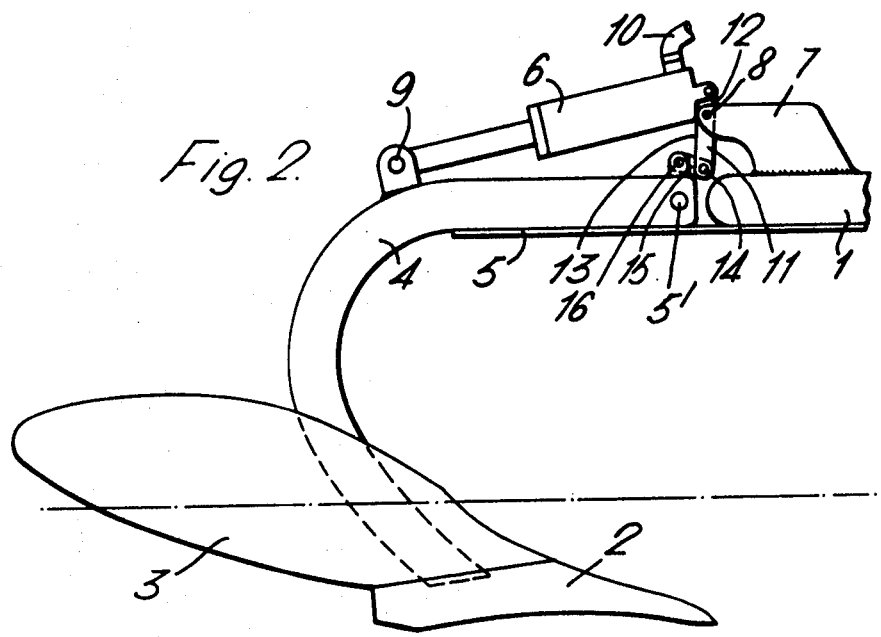
FIG. 2 is a side view of the means of the invention, with the implement, here a plough, in working position.

In the FIGS. 2 and 3 one embodiment of the means of the invention is shown in which the correct pressure conditions are achieved.

As shown, and as compared with the means shown in FIG. 1, a double acting link device is provided between the nose 7 and the implement frame 1 at one side, and the hydraulic device 6 and the implement beam 4 on the other side. The link device comprises a two-armed lever 11 which is hinged to nose 7, the shorter arm 12 of which is connected to the hydraulic device 6 and the longer arm 13 of which is hinge connected at 14 to one end of a link 15, the other end of which is hinged on a nose 16 on the implement beam 4. The length relation between the arms 12 and 13 and the link 15 is so chosen that the means is released when the cutter 2 of the implement, or possibly the mould board 3, meets a certain resistance in the form of a stone, a root or the like. When the resistance is sufficiently high to surmount the counter-pressure of the device 6, the implement will, with its beam 4, swing upwardly, just as in the known arrangement, but the link system will cause the counter-pressure exerted on the implement beam by the pressure device 6 to gradually decrease until a certain angle of the beam 4 is reached, and then be constant until the hinderance is passed and the influence thereof has disappeared. Thereafter the implement returns to working position under the influence of the device 6 which is now alone acting upon the implement, under a continuously increasing pressure, until the implement beam 4 contacts the frame extension 5, and the working position is restored.

In this first embodiment, it is presumed that the device 6 is a hydraulic plunger and cylinder device, but it is also possible to combine such a device with, or to replace the same by, a suitable spring device.

In the second embodiment of the means of the invention, shown in FIGS. 4 and 5, the implement is shown only by its beam. The form of the implement proper, or the arrangement of a plurality of implements one beside the other, possibly relatively displaced, are of no importance to the understanding of the present further development of the means shown in the FIGS. 2 and 3. Such form and arrangement are not therefore shown.

In FIGS. 4 and 5 the implement beam 4 is hinged at 5' on an extension 5 of the implement frame 1, so that the implement may swing upwardly when abutting a hindrance such as a big stone. In order to return the implement to the working position a pressure device 6 is inserted between the frame 1 and the beam 4, the two parts of such device being connected to the two implement parts.

The pressure device in the first embodiment is connected to the implement frame 1 through a link system and directly connected to the implement beam. In the second embodiment a two-armed lever 11' is provided with one longer arm 13' hinged to a link 15' which in turn is supported at 16' on the implement beam 4, while the other, shorter arm 12' is connected to the implement frame 1 through a further link 17. The intermediary point 18 between the arms 12' and 13' is connected to one end of the pressure device 6, while the other end of the pressure device is connected at 8 to a nose 7 on the implement frame 1, at which point the further link 17 is also connected. It is also possible to position the hinge point of the link 17 somewhat underneath and forward of the hinge point 8 of the pressure device 6.

The intermediate link 15 is hinged at 16 on the implement beam 4, but conveniently and as shown in the drawing, the link 15' is provided with a stopper 19 which may engage the beam 4, in order to restrict the swinging movements of the link 15'. The arrangement may also be so that the link 15' engages a face 20 on the extension 5 of the frame 1. Such provisions are made to insure that the movements of the implement are fully controlled by the connecting means. The frame 1 and the beam 4 can be locked relative to each other if desired by a pin through the holes 21, 22.

In FIGS. 6 and 7, also, the implement is shown merely by its beam 4, as the form of the implement proper, and the arrangement of a plurality of more implements one besides the other, possibly displaced relatively to each other, are of no importance to the understanding of the further development of the means shown in FIGS. 2 and 3.

As shown, the implement beam 4 is hinged at 5' on an extension 5 of the implement frame 1, so that the implement may swing upwardly if it abuts against a hindrance such as a big stone. In order to return the implement to the working position a pressure device 6 is provided between the frame 1 and the beam 4, with its two ends and connected to the two implement parts.

The pressure device 6, in the embodiment shown in FIGS. 2 and 3 is connected to the implement frame 1 through a link system and directly connected to the implement beam 4. The embodiment of FIGS. 6 and 7 provides a two-armed lever 11", which is hinged to the pressure device 6'. Lever 11" comprises arm 12" and 13", the ends of which are hinged respectively to one part of the pressure device 6' and to the implement beam 4. Between such ends lever 11" engages a roller 23 which is supported on the implement frame 1. The lower arm 13 is hinged to an upwardly projecting nose 24 on the beam 4. The upper arm 12" is provided with a straight edge 25 which engages the roller 23. When the beam 4, with its implement, is swinging upwardly, the nose 24 will swing downwardly against the frame 1 and will bring along the lever 11", whereby the arm 12" will slide downwardly in engagement with the roller 23.

In the embodiment of FIGS. 6 and 7 the pressure device 6' is shown in the form of a spring device, in which a great number of disc springs 26 are arranged in a telescope device 27, 28. The interior tube 27 forms an exterior guide to the disc springs 26 along the greater part of the length of the device from one end of the same, while the springs are interiorly guided by means of a tube 29 provided in the exterior telescope tube 28. The tube 29 is provided with interior screw threads for engagement with the bolt 30, for the purpose of setting the desired spring force. The bolt 30 is hinged to the lever arm 12".

The other end of the pressure device 6' is hinge connected to the implement beam 4 through a link 15" which is hinged at 16", but is provided with a stopper 19" which engages the outside of the beam 4. Link 15" simultaneously engages an edge 20 of the extension 5 of the frame 1. The link 15" is in solid connection with the beam 4.

In this embodiment, also, the beam 4 may be locked if desired in downswung position relatively to the frame 1, by inserting a pin through holes 21, 22 in the frame and beam, respectively.

I claim:
1. A pressure-releasable connecting means connecting a frame of an agricultural implement and a beam supporting said implement, comprising:
   a pressure device;
   a two-armed lever hinge comprising a shorter arm joined to a longer arm;
   one end of said pressure device being hinge-connected to one end of said longer arm and the other end of said pressure device being linked with said beam;
   said beam being hinge-connected with one end of said shorter arm;
   a roller mounted on said frame and being in engagement with said longer arm; and
   means other than said connecting means for hinge connecting said frame and said beam.
2. The connecting means according to claim 1 wherein an intermediate link means is provided for hinge connecting said pressure device other end with said beam.

References Cited

UNITED STATES PATENTS

| | | | |
|---|---|---|---|
| 397,962 | 2/1889 | Bird | 172—265 |
| 3,468,382 | 9/1969 | Quanbeck | 172—710 |
| 3,483,930 | 12/1969 | Detwiller et al. | 172—266X |

FOREIGN PATENTS 867,469  1/1953  Germany.

ROBERT E. PULFREY, Primary Examiner

S. C. PELLEGRINO, Assistant Examiner

U.S. Cl. X.R.

172—266, 710